United States Patent [19]
Hörmann

[11] Patent Number: 5,870,050
[45] Date of Patent: Feb. 9, 1999

[54] ELECTRONIC MONITORING OF THE DRIVING FORCE OF A DRIVE MECHANISM

[75] Inventor: Michael Hörmann, Halle/Westf., Germany

[73] Assignee: Marantec Antriebs-und Steuerunqstechnik GmbH & Co., Produktions KG, Marienfeld, Germany

[21] Appl. No.: 788,055

[22] Filed: Jan. 23, 1997

[30] Foreign Application Priority Data

Jan. 25, 1996 [DE] Germany .......................... 196 02 633.4

[51] Int. Cl.[6] .................................................. H03M 1/66
[52] U.S. Cl. ............................................................. 341/151
[58] Field of Search ................................... 341/151, 155, 341/165, 144

[56] References Cited

FOREIGN PATENT DOCUMENTS

| | | |
|---|---|---|
| 3501579 | 7/1986 | Germany . |
| 3933266 | 1/1991 | Germany . |
| 4214998 | 11/1993 | Germany . |
| 4440449 | 6/1995 | Germany . |

OTHER PUBLICATIONS

Patent Abstracts of Japan vol. 96, No. 5 (May 31, 1996) and JP 08 012188 (Jan. 16, 1996).

Schönfeld and Habiger, "Automatisierte Elektroantriebe", VEB Verlag Technik Berlin, pp. 73–77 and 265–347 (no date given).

Primary Examiner—Brian Young
Attorney, Agent, or Firm—Dilworth & Barrese

[57] ABSTRACT

The present invention relates to an electronic circuit and a method for the monitoring of the driving force of a drive mechanism. To reduce the costs for such a circuit by simple technical circuit measures it is provided that the comparator unit used for monitoring is designed as an analog component, while the set-point adjuster is still integrated into the digital control unit of the drive mechanism. The set points stored in the set-point adjuster are fed to a digital-analog converter in such a manner that an analog reference signal can be generated which can be compared with the analog measuring signal of a power pick-up via the comparator unit.

17 Claims, 3 Drawing Sheets

ELECTRONIC MONITORING OF THE DRIVING FORCE OF A DRIVE MECHANISM

BACKGROUND OF THE INVENTION

The present invention relates to an electronic circuit and a method with such a circuit for the monitoring of the driving force of a drive mechanism, preferably an electromotive drive mechanism.

To monitor the driving load of a drive mechanism, electronic circuits are used in driving technology which generate an error signal as soon as the operating state of the drive mechanism deviates from a defined value. In the case of automatically driven doors, for example, such a monitoring circuit serves above all to prevent persons from being injured when they unforeseeably enter the closing area during the closing of the door. A monitoring circuit of this type can generally also protect the drive mechanism against overload and so against destruction.

The monitoring circuits which are usually employed are based on the fact that a measured value characterizing the driving load and a defined set point are supplied to a comparator unit. This generates an error signal as soon as the measured value exceeds the set value with the set value then representing the maximally permissible driving load in this case. If the monitoring circuit is realized within the framework of a microprocessor control system, then the set value is generally available in digital form, for example as a value stored in a memory. The detection of the measured value is usually performed with an analog-digital converter so that the measured values can be evaluated in the microprocessor control system. However, such an arrangement has the disadvantage that high component costs are incurred due to the use of an analog-digital converter. In addition, an analog-digital converter for the detection of measured values requires a complicated filter wiring to avoid aliasing effects.

SUMMARY OF THE INVENTION

It is therefore the object of the invention to provide simple technical circuit measures for an electronic circuit of the type described above in order to reduce costs.

This object is solved in accordance with the invention by an electronic circuit with the features of a power pickup whose output signal is an measuring signal of the driving force, a set point adjuster which possesses a digital memory for the storage of at least one digital set point, the stored set points being able to fed to a digital-analog converter in such a manner that an analog reference signal can be generated, and a monitoring comparator unit to which the reference signal and the measuring signal can be fed as analog inputs, an error signal being able to be generated by the monitoring comparator unit as soon as the measuring signal deviates from the reference signal in a defined manner. In its basic design the electronic circuit in accordance with the invention comprises a power pick-up whose output signal is an analog measuring signal of the driving force, a set-point adjuster which possesses a digital memory for the storage of at least one digital set point, with the stored set points being able to be fed to a digital-analog converter in such a manner that an analog reference signal can be generated, and a monitoring comparator unit to which the reference signal and the measuring signal can be fed as analog inputs. The solution in accordance with the invention is therefore based on the fact that the comparison between the measuring signal and the set point is not performed as a calculating operation in the microprocessor control system but by an analog comparator unit. For this purpose, the set point which is available as a digital value is fed to a digital-analog converter so that the analog reference signal which has been converted in this manner can be compared with the analog measuring signal, with an error signal being able to be generated by the monitoring comparator unit as soon as the measuring signal deviates from the reference signal in a defined manner.

The invention has the advantage that an expensive analog-digital converter with complicated filter wiring can be eliminated so that the costs of an electronic circuit of this type can be reduced considerably. Even though in this case a digital-analog converter must be used to convert the digital set point, in the specified application a digital-analog conversion is in general cheaper in price than performing an analog-digital conversion. As a result, the present invention overcomes a prevailing public prejudice that a processing of measured values with a microprocessor control system always requires an analog-digital conversion of the measured value. In the circuit in accordance with the invention, however, expensive circuit elements are replaced by cheaper analog circuit elements while at the same time the actual advantages of a microprocessor control system, namely flexibility thanks to the exchangeability of software, need not be given up.

In a preferred embodiment of the invention a reference signal dependent on time can be generated after a digital-analog conversion by means of several digitally stored set points. This is particularly advantageous, if the driving motion has a constantly recurring behaviour and the driving load is thus known in advance. In this case it is also conceivable that before putting the drive mechanism into operation the relevant behaviour of the driving load of the drive mechanism is gained just once from the measuring signal by means of an analog-digital converter, with the analog-digital converter required for this being able to be used for several monitoring circuits without it having to be installed in every circuit. During operation the set-point adjuster is also activated with each start of the drive mechanism so that the stored sample values can be emitted via a digital-analog converter and can be compared as an analog reference signal with the actual behaviour of the force. By means of such a time-dependent reference signal the response threshold can always be set to a constant value. In a special case it is, of course, also possible to generate only a digital set point and so a constant reference voltage. This corresponds to the case where a constant voltage is given directly as a reference voltage.

A further preferred embodiment of the invention provides that the monitoring comparator unit preferably consists of an operation amplifier which is operated as a comparator. Such operation amplifiers are available in many forms and at low prices. The operation amplifier appropriately generates an error signal as soon as the measuring signal shows a greater voltage than the reference signal. When several operation amplifiers are used, more complicated combinational logics are, of course, also conceivable.

When a d. c. motor is used as a drive mechanism, the power pick-up can be realized in a particularly advantageous manner by measuring the current of the drive current via an instrument shunt followed by a measuring amplifier. Other measuring principles which detect other measurable variables characterizing the driving load are, of course, also conceivable.

In a further preferred embodiment the set-point adjuster is integrated in a digital control unit which also comprises the logic to control the drive mechanism. To realise a digital-analog conversion of the stored digital set points at a reasonable price, a pulse width modulator is preferably used whose pulse ratio and mean output voltage are proportional to the fed digital set points.

An improvement of the invention of the electronic circuit in accordance with the invention comprises an electronic set-point adjuster with the features of a control comparator unit which possesses as inputs the analog measuring signal of the driving force and an analog control signal, wherein a negative deviation signal can be generated from the comparison of the two inputs of the control comparator unit, a control system which possesses as an input the negative deviation signal and whose output is the analog control signal, wherein the control system is designed in a manner such that under normal operating conditions the drive mechanism, the amount of control deviation between the measuring signal and the control signal is smaller than a given threshold value, and a digital threshold value adder whose input is a digital control offset which corresponds to the control signal, wherein by adding the control offset to a given threshold value a digital set point can be determined. The solution in accordance with the invention provides that the set points are no longer read into the set-point adjuster at one time before the drive mechanism is put into operation, but rather that the set point is automatically fed to the actual measured value by means of a control system. Here, this control system is designed in such a way that under normal operating conditions of the drive mechanism the amount of the control deviation between the measuring signal and the control signal is smaller than a given threshold value. This means that the control system is optimized in such a way that on the one hand it can follow the changes of the measuring signal which are to be expected, but on the other hand is also slow enough not to take into account any unexpected fast changes.

The improvement in accordance with the invention has the advantage that the monitoring circuit can adapt automatically to long-term changes in the operating behaviour of the drive mechanism. The driving force might, for example, change in the course of time due to corrosion or abrasion in a permissible manner which in the case of fixed set point curves might, however, lead to the generation of an error signal and so to a switching off of the drive mechanism. The improvement in accordance with the invention of the electronic circuit with an electronic set-point adjuster, in contrast, allows the set point to be adapted automatically to any permissible changes in the actual behavior of the drive mechanism.

In accordance with a preferred embodiment the control system is integrated into a digital control unit with the analog negative deviation signal being able to be fed to the control system as a digital value via an analog-digital converter and with a control offset currently determined by the control system being able to be fed to the control comparator unit via a digital-analog converter as an analog control signal. Preferably, the threshold value adder is also integrated into the digital control unit so that the threshold value can be stored as a digital value in a digital memory. In contrast to the analog-digital converter to be used for the recording of measuring signals a very reasonably priced analog-digital converter can be used for the conversion of the analog negative deviation signal, as the control system can also be operated with a low resolution of the negative deviation signal. An integration of the control system and the threshold value adder into the digital control unit therefore offers on the whole the advantage that a further reduction in costs is possible.

A further preferred embodiment provides that instead of the analog control signal the analog reference signal can be fed as an input to the control comparator unit via an amplifier, in which the gain constant of the amplifier depends on the value of the digital control offset. This has the advantage that a further digital-analog converter can be eliminated in this way. If, however, the reference signal is used as an input for the control comparator unit instead of the control offset, it must be taken into account that the value of the reference signal is higher by a certain threshold value than that of the control offset. Therefore an amplifier with a gain constant dependent on the control offset is provided which again attenuates the reference signal accordingly.

Further solutions in accordance with the invention consist of a method for the electronic monitoring of the driving force with the features of a digital set point being and of stored in the digital memory of the set-point adjuster, an analog reference signal being generated from the digital set point via a digital-analog converter, the analog measuring signal of the driving force and the analog reference being fed to the monitoring comparator unit, and the monitor comparator unit generating an error signal, as soon as the measuring signal possesses a larger voltage than the reference signal and of a method for the electronic determination of digital set points with the features of a digital control offset being constantly tracked by means of a control system to match the analog measuring signal of the driving force, wherein the control system is designed in such a manner that under normal operating conditions of the drive mechanism, the amount of the negative deviation between the measuring signal and the control offset is smaller than a given threshold, and the digital set point is calculated by adding the given threshold value to the currently determined control offset.

The electronic circuit in accordance with the invention and the electronic set-point adjuster in accordance with the invention are preferably used for closing elements, such as doors, roller blinds or windows.

BRIEF DESCRIPTION OF THE DRAWINGS

Further details and advantages of the invention are described in greater detail by means of the embodiments shown in the drawing in which.

DESCRIPTION OF THE PREFERRED EMBODIMENTS

Figure 2:
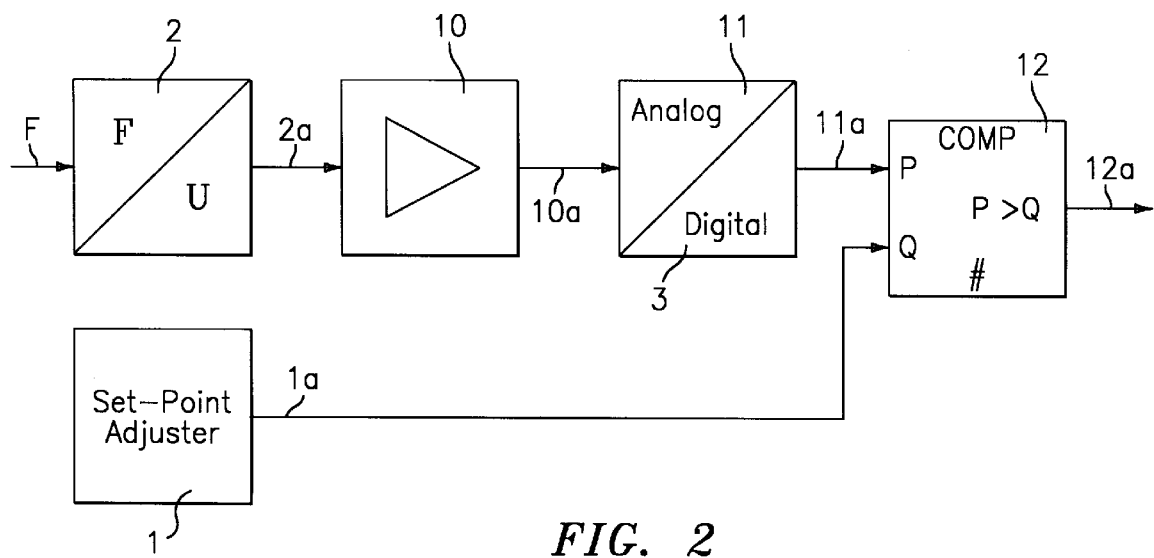

FIG. 2 shows a prior art monitoring circuit. This circuit consists of a power pick-up (2) whose analog output signal (2a) is an analog measuring signal of the driving force or of the driving load of the drive mechanism. The analog measuring signal (2a) is fed to an amplifier (10) which possesses a corresponding filter wring to suppress high-frequency interference in the measuring signal (2a). The filtered measuring signal (10a) is fed to an analog-digital converter (11) and read in by means of a digital control unit in digital form. The digital control unit comprises a set-point adjuster (1) and a comparator unit (12) with the comparator unit (12)

being realized in the form of an arithmetic instruction. The digital measured value (11a) and the set point (1a) are fed to the comparator unit (12). As soon as the measured value exceeds the set point in a non-permissible manner, the comparator unit (12) generates the error signal (12a).

Figure 1:
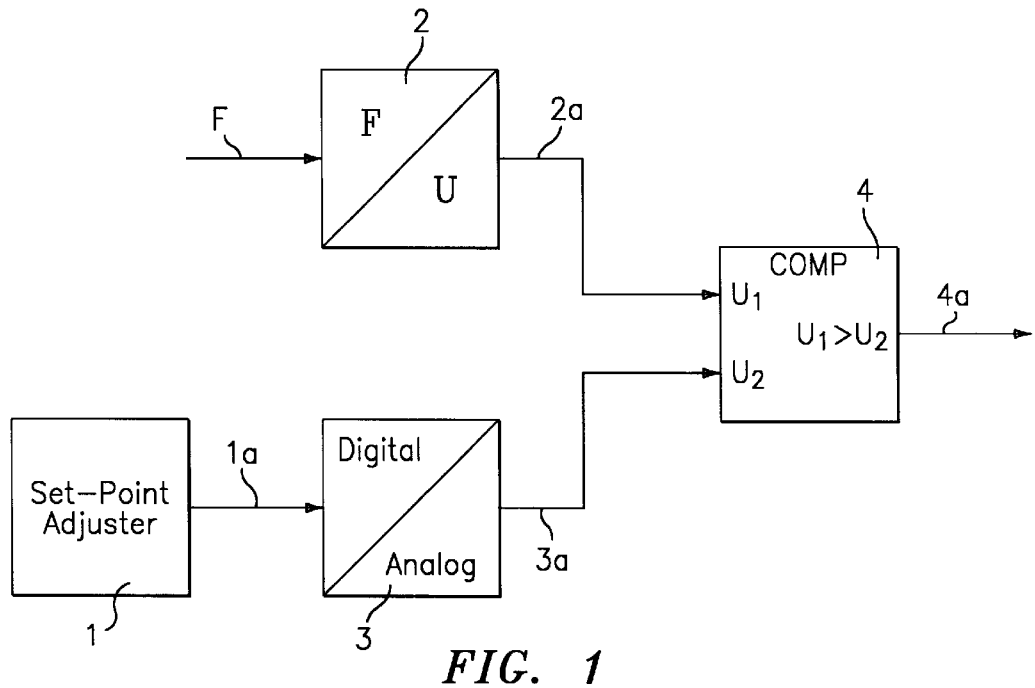
FIG. 1 shows a schematic circuit diagram of an electronic monitoring circuit in accordance with the invention, FIG. 2 a schematic circuit diagram of a prior art electronic monitoring circuit, FIG. 3 a first embodiment in accordance with the invention of an electronic monitoring circuit with the electronic set-point adjuster in accordance with the invention and FIG. 4 a second embodiment of an electronic monitoring circuit in accordance with the invention with the electronic set-point adjuster in accordance with the invention.

FIG. 1, in contrast, shows a schematic circuit diagram of the monitoring circuit in accordance with the invention. In this case, the monitoring comparator unit is external to the digital control unit and consists of the comparator (4). The set points (1a) stored in the set-point adjuster (1) are converted into an analog reference signal (3a) via a digital-analog converter (3). This signal is fed together with the analog measuring signal (2a) to the comparator which compares the two applied voltages U1 and U2 with each other and generates an error signal (4a) as soon as the measuring signal (2a) is larger than the measuring signal (3a).

If d.c. drive mechanisms are used, the power pick-up is based on a current measurement of the drive current. This is concluded from the knowledge that the drive current in d.c. drive mechanisms is a measure of the applied moment or for the driving force. The current measurement is performed via an instrument shunt with the voltage applied to it being fed to a measuring amplifier. The digital-analog converter preferably consists of a pulse width modulator which converts a digital input value into a pulse rate whose pulse ratio is proportional to the applied value. To obtain an analog voltage, the pulse rate is smoothed in a simple manner, for example by a capacitor.

In the operating principle of the electronic circuit in accordance with the invention an initialization mode, a test mode and a normal mode can be distinguished. The initialization mode is used to determine suitable set points for the set-point adjuster (1) and to store these accordingly. The determination of the set points also takes into account the special circumstances under which the relevant drive mechanism is utilised. The test mode is used to subject the monitoring circuit to a self-test. Such a self-test is particularly necessary if the monitoring circuit in accordance with the invention is to be used to prevent persons from being injured. In this case, it can be determined by a self-test before the start of the normal mode whether a flawless functioning of the monitoring circuit is given.

To perform a self-test in the test mode the set-point adjuster presets the set point (1a) to such a low level that it will be exceeded for a short time by the drive mechanism when it starts up. If an error signal (4a) is generated in this case, the function of the monitoring circuit is guaranteed and the set-point adjuster adjusts the corresponding set points for the normal mode.

The normal mode is again to be distinguished as to whether only a constant set point or a scanning sequence that changes over time is preset by the set-point adjuster. In the first case, a constant reference voltage (3a) is applied to the monitoring comparator unit (4) during the whole normal mode. The second case must be considered in particular when a constantly recurring motion is performed by the drive mechanism. During the start of the drive mechanism the set-point adjuster receives a trigger signal as a result of which the load behavior (3a) to be expected with regard to time is constantly compared with the measuring signal (2a) of the current driving force. In both cases, an error signal (4a) is generated as soon as the voltage of the measuring signal (2a) exceeds the voltage of the reference signal (3a).

Figure 3:
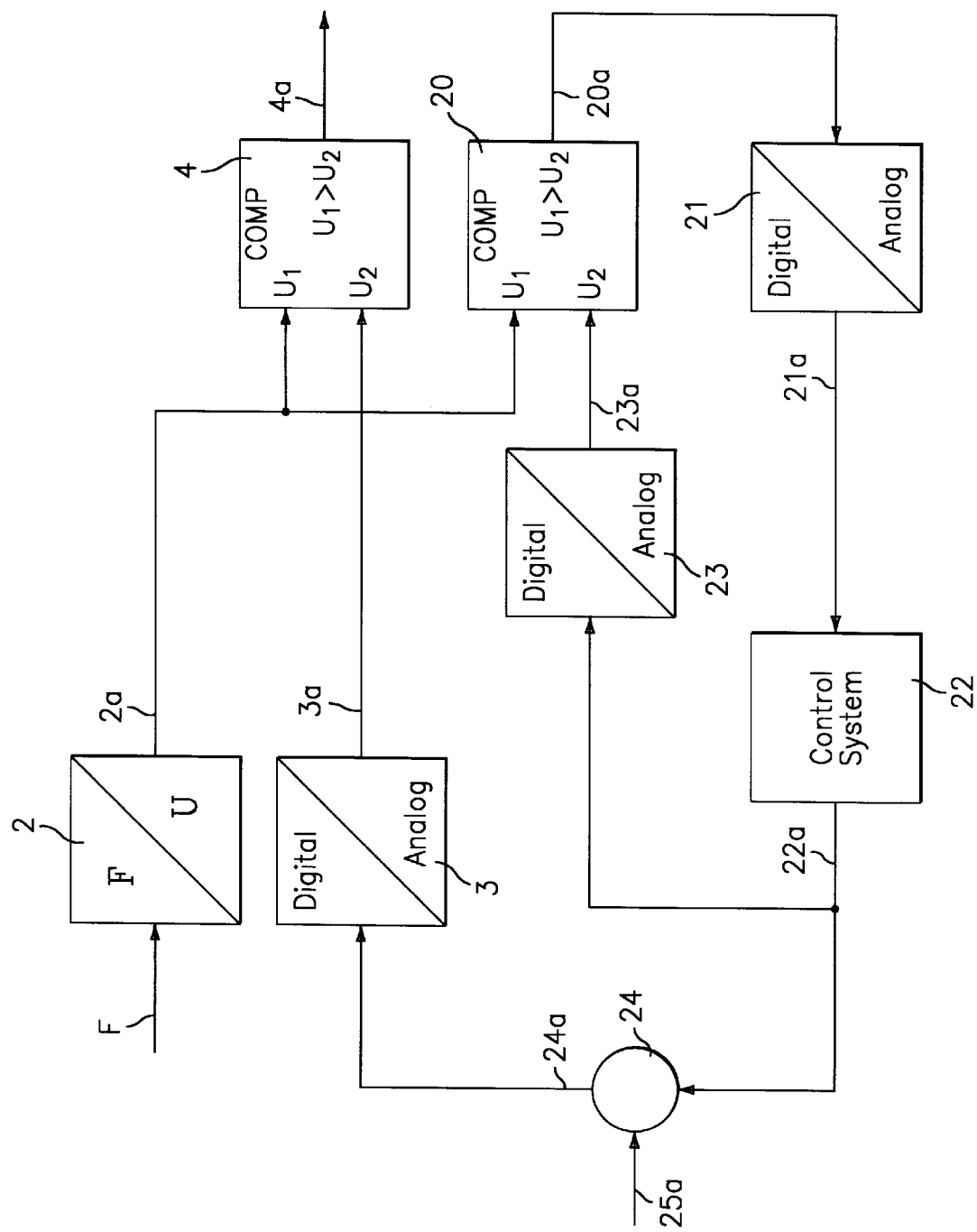

FIG. 3 shows a schematic circuit diagram of an improvement in accordance with the invention of a monitoring circuit in accordance with the invention according to FIG. 1. In this case, the set-point adjuster (1) has been replaced by an automatic tracking of the set point. The basic principle of the circuit expansion consists of the reference signal (3a) being constantly tracked to the measuring signal (2a). The tracking by the control system (22) is set to be so sluggish that unexpected fast changes in the behavior of the measuring signal (2a) are not taken into account by the control system (22) so that in these cases the measuring signal again exceeds the reference signal and an error signal is generated.

Accordingly, the expanded circuit element comprises a control comparator unit (20) which detects any deviation of an internal control offset (22a) from an analog measuring signal (2a). Appropriately, the control system is integrated into the digital control unit so that the control offset (22a) is fed via a digital-analog converter (23) to the control comparator unit (20) as a control signal (23a). The negative deviation signal (20a) generated by the control comparator unit (20) is in turn fed as digital values (21a) via an analog-digital converter (21) to the control unit (22). For this purpose, an analog-digital converter with low resolution is sufficient as the analog-digital converter (21), since only the sign of the negative deviation signal (20a) has to reach the control unit (22) as essential control information.

Within the digital control unit the control offset (22a) is fed to a threshold value adder (24) which adds a threshold value (25a) to the control offset (22a). The threshold adder (24) is here realized in the form of an arithmetic operation. The basis of the threshold value adder (24) is the actual set point (24a) or a corresponding scanning sequence of set points. The values (24a) are then fed as a reference signal (3a) via a digital-analog converter (3) to the monitoring comparator unit (4).

After the control system has been set up and programmed correspondingly in the initialization-mode, in normal mode it first has to be assumed that the control offset (22a) corresponds to the measuring signal (2a). If the measuring signal (2a) now changes, the control comparator unit (20) detects a deviation from the control offset (22a) upon which the negative deviation signal (20a) reaches the control system (22) via the digital-analog converter (21). With a certain delay the measuring signal (2a) will then again return to the corresponding value for the control offset. The control system is designed in such a way that the deviation between the measuring signal (2a) and the control offset (22a) in the interference-free normal mode will always remain below the given threshold value (25a). As the control offset is increased by this threshold value (25a) by the threshold value adder (24), the measuring signal (2a) will therefore never exceed the reference signal (3a) during the interference-free normal mode. If, however, an unforeseeable behavior with a fast increase in the driving force (F) occurs and thus also in the measuring signal (2a), the deviation between the measuring signal (2a) and the control offset (22a) exceeds the threshold value (25a). If this is the case, the measuring signal (2a) is simultaneously also greater than the reference signal (3a) so that an error signal (4a) is generated by the monitoring comparator unit (4).

A test mode can be set up accordingly for the electronic circuit shown in FIG. 3 by presetting the threshold value (25a) to corresponding low level at the beginning of any drive motion. In this case, the monitoring comparator unit (4) will also respond briefly during the start of the drive mechanism so that the normal mode can be taken up for which the threshold value (25a) has to be increased again correspondingly.

Figure 4:
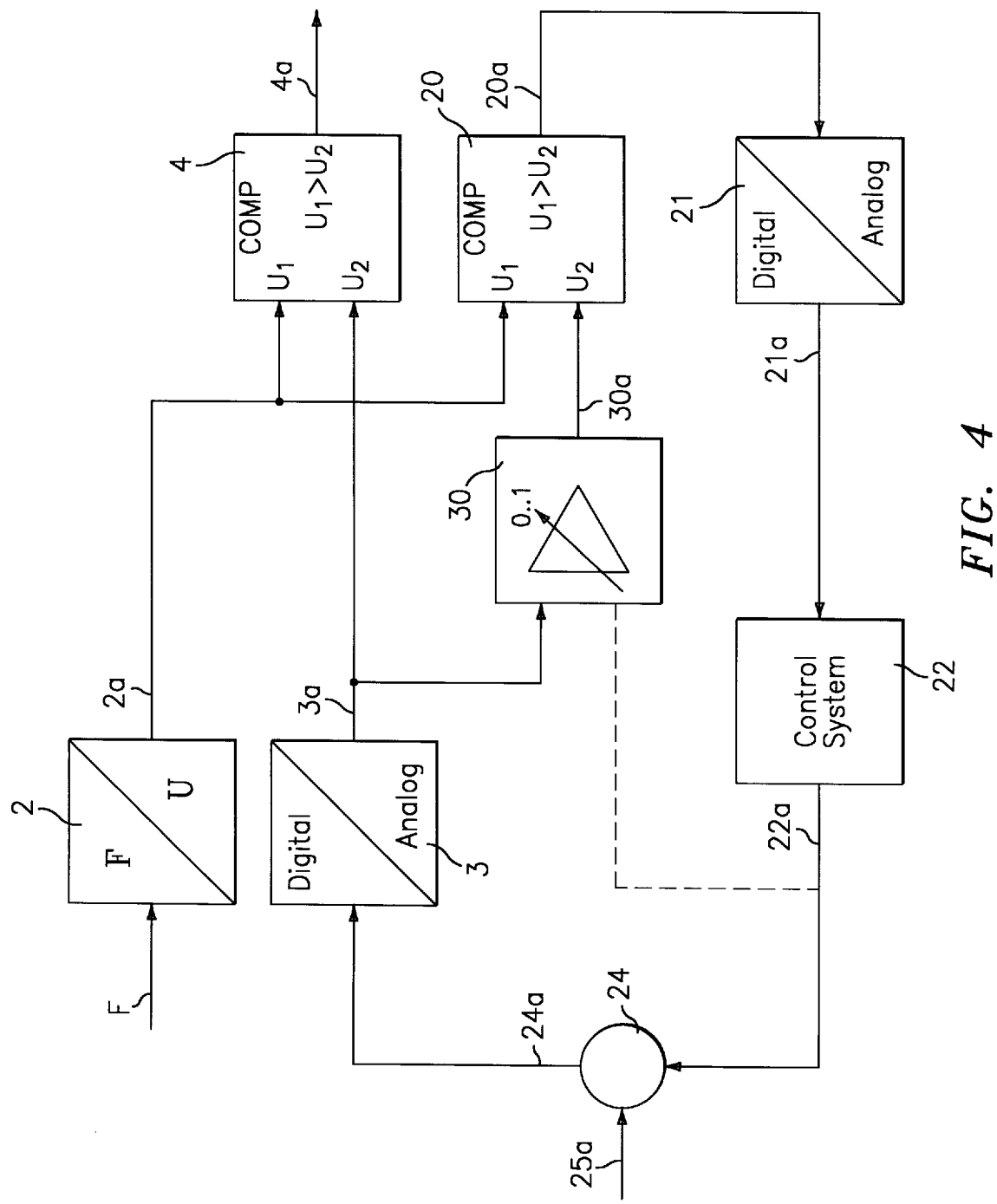

FIG. 4 shows a second embodiment of the circuit in accordance with the invention according to FIG. 3. Here, the digital-analog converter (23) has been eliminated by not feeding the control offset (22a) but the deviation signal (3a) itself to the control comparator unit (20). Here, it must however be taken into account that the reference signal (3a) is increased by the threshold value (25a) compared with the control offset (22a). Consequently, an amplifier or an attenuator (30) is provided whose amplification factor is controlled by the value of the control offset (22a). As a result of this, the control signal (30a) corresponds approximately to the control signal (23a) from FIG. 3 so that the function sequence of the circuit of FIG. 4 otherwise resembles the circuit according to FIG. 3.

I claim:

1. An electronic circuit to monitor the driving force of a drive mechanism, comprising
    a power pick-up (2) whose output signal is an analog measuring signal (2a) of the driving force (F),
    a set-point adjuster (1) which possesses a digital memory for the storage of at least one digital set point, with the stored set points (1a) being able to be fed to a digital-analog converter (3) in such a manner that an analog reference signal (3a) can be generated,
    a monitoring comparator unit (4) to which the reference signal (3a) and the measuring signal (2a) can be fed as analog inputs, with an error signal (4a) being able to be generated by the monitoring comparator unit (4), as soon as the measuring signal (2a) deviates from the reference signal (3a) in a defined manner,
    a control comparator unit (20) which possesses as inputs the analog measuring signal (2a) of the driving force and an analog control signal (23a), wherein a negative deviation signal (20a) can be generated from the comparison of the two inputs of the control comparator unit (20),
    a control system (22) which possesses as an input the negative deviation signal (20a) and whose output is the analog control signal (23a), wherein the control system (22) is designed in such a manner that under normal operating conditions of the drive mechanism the amount of the control deviation (20a) between the measuring signal (2a) and the control signal (23a) is smaller than a given threshold value (25a), and
    a digital threshold value adder (24) whose input is a digital control offset (22a) which corresponds to the control signal (23a), wherein by adding the control offset (22a) to a given threshold value (25a) a digital set point (24a) can be determined.

2. An electronic circuit in accordance with claim 1, wherein the reference signal (3a) is a constant voltage.

3. An electronic circuit in accordance with claim 1, wherein the reference signal (3a) is a voltage curve dependent on time.

4. An electronic circuit in accordance with claim 1, wherein an error signal (4a) can be generated by the monitoring comparator unit (4) as soon as the measuring signal (2a) shows a greater voltage than the reference signal (3a).

5. An electronic circuit in accordance with any of claim 1, wherein the drive mechanism is a d.c. motor and the power pick-up (2) is based on a measurement of the drive current.

6. An electronic circuit in accordance with claim 1, wherein the set-point adjuster (1) is integrated in a digital control unit.

7. An electronic circuit in accordance with claim 1, wherein the monitoring comparator unit (4) is a comparator consisting of an operation amplifier.

8. An electronic circuit in accordance with claim 1, wherein the digital/analog converter (3) consists of a pulse width modulator whose pulse ratio and mean output voltage (3a) are proportional to the fed digital set points (1a).

9. An electronic circuit in accordance with claim 1, wherein the control system (22) is integrated into a digital control unit, with the analog negative deviation signal (20a) being able to be fed as a digital value (21a) via an analog-digital converter (21) to the control system (22) and a control offset (22a) currently determined by the control system (22) being able to be fed to the control comparator unit (20) via a digital-analog converter (23) as an analog control signal (23a).

10. An electronic circuit in accordance with claim 9, wherein the threshold value adder (24) is integrated into the digital control unit and the threshold value (25a) can be stored as a digital value in a digital memory.

11. An electronic circuit in accordance with claim 1, wherein instead of the analog control signal (23a) the analog reference signal (3a) can be fed as an input to the control comparator unit (20) via an amplifier (30) and the gain constant of the amplifier (30) depends on the value of the digital control offset (22a).

12. A method for the electronic monitoring of the driving force of a drive mechanism with a circuit, comprising the following steps:
    a) a digital set point (1a) is stored in a digital memory of a set-point adjuster (1),
    b) a digital control offset (22a) is constantly tracked by means of a control system (22) to match an analog measuring signal (2a) of the driving force, wherein the control system (22) is designed in such a manner that under normal operating conditions of the drive mechanism an amount of negative deviation (20a) between the measuring signal (2a) and the control offset (22a) is smaller than a given threshold value (25a),
    c) a digital set point (24a) is calculated by adding the given threshold value (25a) to the currently determined control offset (22a),
    d) an analog reference signal (3a) is generated from the digital set point (1a) via a digital-analog converter (3),
    e) the analog measuring signal (2a) of the driving force and the analog reference signal (3a) are fed to a monitoring comparator unit (4), and
    f) the monitoring comparator unit (4) generated an error signal (4a), as soon as the measuring signal (2a) possesses a larger voltage than the reference signal (3a).

13. The use of an electronic circuit in accordance with claim 1 for closing elements.

14. The use of the method of claim 12 for closing elements.

15. The electronic circuit of claim 1, wherein the drive mechanism is an electromotive drive mechanism.

16. The use of an electronic circuit in accordance with claim 13, wherein the closing elements are doors, roller blinds or windows.

17. The use of the method of claim 14, wherein the closing elements are doors, roller blinds or windows.

* * * * *